(12) United States Patent
Carlisle

(10) Patent No.: US 7,343,684 B2
(45) Date of Patent: Mar. 18, 2008

(54) ROBOTIC SYSTEM WITH TRACTION DRIVE

(76) Inventor: Brian Carlisle, 5565 Oak Knoll La., Auburn, CA (US) 95602

( * ) Notice: Subject to any disclaimer, the term of this patent is extended or adjusted under 35 U.S.C. 154(b) by 0 days.

(21) Appl. No.: 11/355,796

(22) Filed: Feb. 16, 2006

(65) Prior Publication Data

US 2007/0186426 A1    Aug. 16, 2007

(51) Int. Cl.
G01B 5/004 (2006.01)
(52) U.S. Cl. .......................................... 33/1 M; 33/503
(58) Field of Classification Search ................... 33/503, 33/1 M
See application file for complete search history.

(56) References Cited

U.S. PATENT DOCUMENTS

| | | | |
|---|---|---|---|
| 4,013,280 A * | 3/1977 | Chitayat et al. .............. | 33/1 M |
| 4,487,067 A | 12/1984 | Stebbins et al. | |
| 4,487,090 A | 12/1984 | Burnham | |
| 4,555,963 A | 12/1985 | Nelson | |
| 5,035,154 A | 7/1991 | Jonischus | |
| 5,326,335 A | 7/1994 | Takei | |
| 5,345,832 A | 9/1994 | Takei | |
| 5,346,337 A | 9/1994 | Truesdell | |
| 5,357,819 A | 10/1994 | Takei | |
| 5,388,343 A * | 2/1995 | Garau et al. .................. | 33/503 |
| 5,621,978 A * | 4/1997 | Sarauer ....................... | 33/503 |
| 6,058,618 A * | 5/2000 | Hemmelgarn et al. ........ | 33/503 |
| 6,482,121 B2 | 11/2002 | Okoshi | |
| 6,648,509 B2 | 11/2003 | Watson | |
| 6,822,749 B1 * | 11/2004 | Christoph .................... | 33/503 |
| 6,826,840 B1 * | 12/2004 | Lindsey et al. ............... | 33/503 |
| 6,840,886 B2 | 1/2005 | Ohara | |
| 6,849,025 B2 | 2/2005 | Chikaraishi et al. | |

* cited by examiner

Primary Examiner—Christopher W Fulton

(57) ABSTRACT

A robotic system including at least one support that supports a carriage for movement. The support may include a drive surface that is a "net shape" surface, i.e., is formed without machining. The carriage may have a traction drive that engages with the drive surface to move the carriage relative to the support. The traction drive may allow for slip at the drive surface. A bearing arrangement used to support the carriage on the support may require mainly radial forces be exerted on roller bearing elements on the carriage. A machine vision system and/or force control techniques may be used to control movement of the carriage and/or other portions of the robotic system.

24 Claims, 7 Drawing Sheets

ROBOTIC SYSTEM WITH TRACTION DRIVE

BACKGROUND

1. Field of Invention

Aspects of the invention relate to robotic systems, e.g., a Cartesian robot including machine vision, force control, and a traction drive for moving at least one portion of the robot.

2. Related Art

With the increasing miniaturization of many products and processes, tolerances and quality requirements are approaching the point where people cannot reliably handle material or assemble products without causing damage to or contamination of the material or products. This has increased the demand for automation for handling and assembling small components in many industries, including for example, semiconductor, mass storage, life sciences, laboratory automation, medical products, consumer electronics, automotive, etc.

The cost of automation that is capable of high-tolerance material handling and assembly has increased, largely because of the approach taken by machine manufacturers. Machines have been built with increased accuracy, employing expensive machining, bearings, actuators and feedback devices to achieve high levels of absolute accuracy.

SUMMARY OF INVENTION

However, as appreciated by the inventor, this approach to machine design may have at least two fundamental limitations: (1) it is practically impossible to make a perfect machine, and (2) as manufactured or handled components become smaller, the uncertainty in the position of the components increases when computed as a percentage of the components' total dimensions. As a result, position tolerance stack up can make it impossible to assemble components even with a perfect machine.

In accordance with one aspect of the invention, it is possible to both reduce the cost of automation dramatically, and improve performance, by using a machine architecture that intrinsically has high resolution, but low absolute accuracy and repeatability, and through the use of sensing, for example dual-loop encoders, machine vision and/or force sensing, to improve repeatability and correct for errors associated with component acquisition and placement. Based on these compensations, the robotic device can be guided to properly position the component. This results in much lower costs for structures, bearings, actuators, and feedback devices used in the robotic device.

In another aspect of the invention, it is possible to further reduce the cost of automation if the control system can be made compact enough to fit inside of the robotic device, thus eliminating external cables, cabinets, and/or floor space requirements of a robotic device having a separate machine controller.

While many assembly machines have been built that incorporate dual-loop encoders, machine vision and other sensing modes to improve repeatability and accuracy, one illustrative embodiment of the invention incorporates a new machine architecture composed of a low-cost, high-resolution, low-repeatability actuator, a low-cost structure, and a low-cost controller with advanced servo control and both machine vision and force control capabilities, that is embedded inside the machine structure. This embodiment may achieve position placement capability of 1 micron, with no backlash, for a machine price of about $15,000. Other machines on the market with this capability sell for $100,000 and higher.

In embodiment of the invention, a robotic device may have a low-cost structure, a low-cost, zero-backlash traction drive system that can slip, and a compact controller with machine vision and force control capabilities. The machine design can use dual-loop encoders to correct for the traction drive slippage and may include a vision system to simultaneously see a component being manipulated and the component's placement destination in the same field of view. This permits the vision system to measure a position error between the component and its destination, with little or no reliance on machine accuracy.

The robotic device may have a Cartesian-type arrangement with one or more carriages that are movable relative to a corresponding linear support. Each linear support may be largely formed of an extruded material, with optional linear bearing surfaces attached to the extrusion, and a traction surface arranged parallel to the carriage's movement axis. The carriage drive system may include a motor with a traction wheel that contacts the traction surface on the linear support to drive the carriage with no backlash or cogging, but allow for slip between the traction roller and the traction surface. The carriage may also include rotary bearings that contact the linear bearing surfaces and support the carriage for movement along the linear support. The linear support, including the traction surface, may be manufactured to normal extrusion tolerances, which can have as much as 1000 microns of twist or bend per meter. Thus, the traction surface may be a "net shape" element, i.e., may be formed during the extrusion process only and without any machining or other post-extrusion processing to smooth, straighten or flatten any portion of the traction surface. Despite the relative inaccuracy of the traction surface, the robotic device may be capable of 1 micron positioning capability of the carriage relative to the linear support.

The controller for the robotic device may include: power electronics to drive the motors; feedback inputs for one or more encoders or other devices that measure position; a processor to control motion, process sensor input and compensate for actuator slippage; input and output signal processing; and communications interfaces, e.g. Ethernet, DeviceNet and RS-232.

A machine vision camera may be mounted such that the camera field of view can see both the component held by the robot, and the placement destination at the same time. For example, the camera may view the component and its placement destination along the placement axis, e.g., through a hole or other opening in a portion of the robotic device. Current assembly machines that incorporate machine vision are designed with cameras offset from the placement axis, such that one or more pictures must be taken, with a machine motion required after the picture is taken. Thus, the placement precision depends on the absolute accuracy of the machine motion. One aspect of the invention eliminates this requirement, allowing a low-accuracy machine to achieve high-precision component placement.

In one embodiment, a controller for the robotic device can also measure and control forces applied by the carriage drive system(s). Because of the direct-drive nature of the drive system, which eliminates the high friction associated with speed reducers, this can be done by measuring and controlling current to the motors while compensating for gravity loading. This approach allows low-cost force control without the use of delicate strain gauges or other sensors, which add cost and reduce reliability. For higher resolution force control, the controller can use such sensors when needed.

In one aspect of the invention, a robotic system includes a first carriage movable relative to a first axis, and a first drive system including a traction wheel and associated with the first carriage. A first support supports the first carriage for movement relative to the first axis, and has a portion with a drive surface that is contacted by the traction wheel to move the first carriage relative to the first support. The drive surface on the first support may be a "net shape surface" requiring no machining for formation For example, the surface contacted by the traction wheel may be formed during an extrusion, pultrusion, casting, or other process that requires no machining to form the drive surface. A position sensor may be adapted to determine a position of the first carriage relative to the first support. In one embodiment, the traction wheel and drive surface are arranged to allow for slip of the traction wheel relative to the drive surface. The position sensor may include a linear encoder and/or a rotary encoder to detect the position of the carriage relative to the support and/or an encoder to detect motion and/or the position of the traction wheel.

In one embodiment, the first support may include a plurality of guide rails that engage with rolling bearing elements on the first carriage. The guide rails and rolling bearing elements may be arranged so that rotational forces on the first carriage about an axis parallel to the first axis are resisted by primarily radial forces at the rolling bearing elements. Such an arrangement may be advantageous because relatively inexpensive roller bearings (which may be capable of supporting relatively high radial loads, but not necessarily high axial loads) may be used to support the carriage, even in the presence of a cantilevered or other arrangement that exerts a high moment on the carriage.

These and other aspects of the invention will be appreciated and/or obvious from the following description and the appended claims.

BRIEF DESCRIPTION OF THE DRAWINGS

Aspects of the invention are described with reference to the following drawings in which like numerals reference like elements, and wherein.

DETAILED DESCRIPTION

Various aspects of the invention are described below with reference to illustrative embodiments. However, it should be understood that aspects of the invention are not limited to those embodiments described below, but instead may be used in any suitable system or arrangement. Moreover, aspects of the invention may be used alone or in any suitable combination with other aspects of the invention. For example, a preferred position encoder arrangement is described below in which a unique index code is provided for each set of lines in a count track. It should be understood that this aspect of the invention may be used with a robotic device having a traction drive, machine vision system and/or other features described herein, or may be used in other robotic systems without such features. As another example, a robotic device that incorporates a traction drive and "net-shape" drive surface for the traction wheel in accordance with one aspect of the invention need not also use the preferred position encoder and/or a machine vision system, etc.

Figure 1:
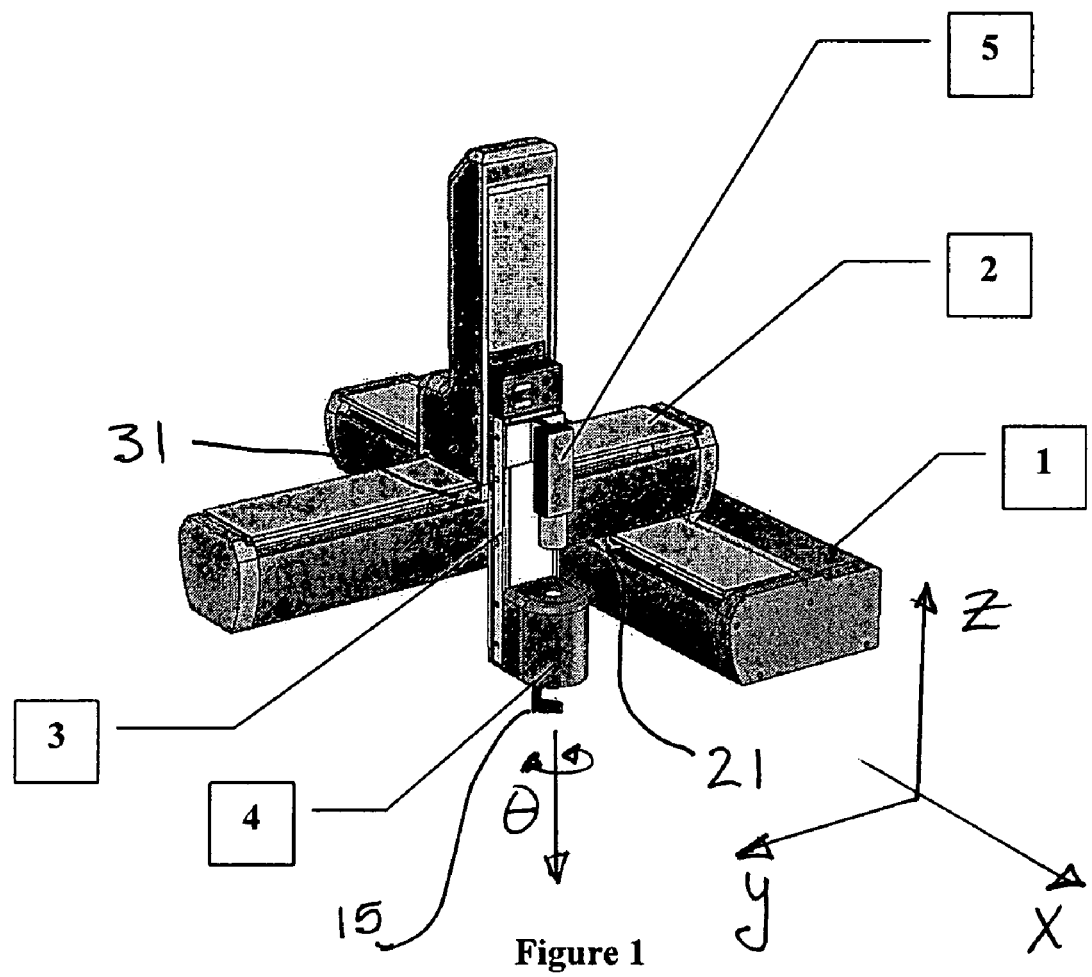
FIG. 1 shows an illustrative embodiment of a robotic device in accordance with the invention.

One embodiment of the invention shown in FIG. 1 is a robotic device that can move a workpiece or tool relative to three linear axes and one rotary axis. Of course, it will be understood that a robotic device in accordance with aspects of the invention may be moveable relative to any suitable number of axes, whether that movement is linear, rotary or other. In this embodiment, the robotic device includes an X-axis linear support 1, a Y-axis linear support 2, a Z-axis linear support 3, a theta axis rotary support 4 and a machine vision camera 5. The X-axis linear support 1 may be fixed relative to a larger base or other structure (not shown). The Y-axis linear support 2 may be moved in a direction parallel to the X-axis via a Y carriage 21 that engages with the X-axis linear support 1. The Y-axis linear support 2 may be cantilevered from the Y carriage 21 and support a Z carriage 31 (which is fixed to the Z-axis linear support 3) for movement in a direction parallel to the Y-axis. Accordingly, the Y-axis linear support 2 and the Z-axis linear support 3 may be moved linearly along the X and Y axes, respectively. The theta axis support 4 may be moveable in a direction parallel to the Z-axis, e.g., by a carriage arrangement like that for the Y and Z carriages 21 and 31 or by any other suitable arrangement. The theta axis support 4 may also support a tool 15, such as a gripper or other, for rotation about a theta axis that is parallel to the Z-axis. By controlling the movement of the Y and Z carriages 21 and 31 and other portions of the robotic device, a workpiece attached to the tool 15 may be moved in the X, Y and Z directions as well as be rotated about the theta axis.

Figure 2:
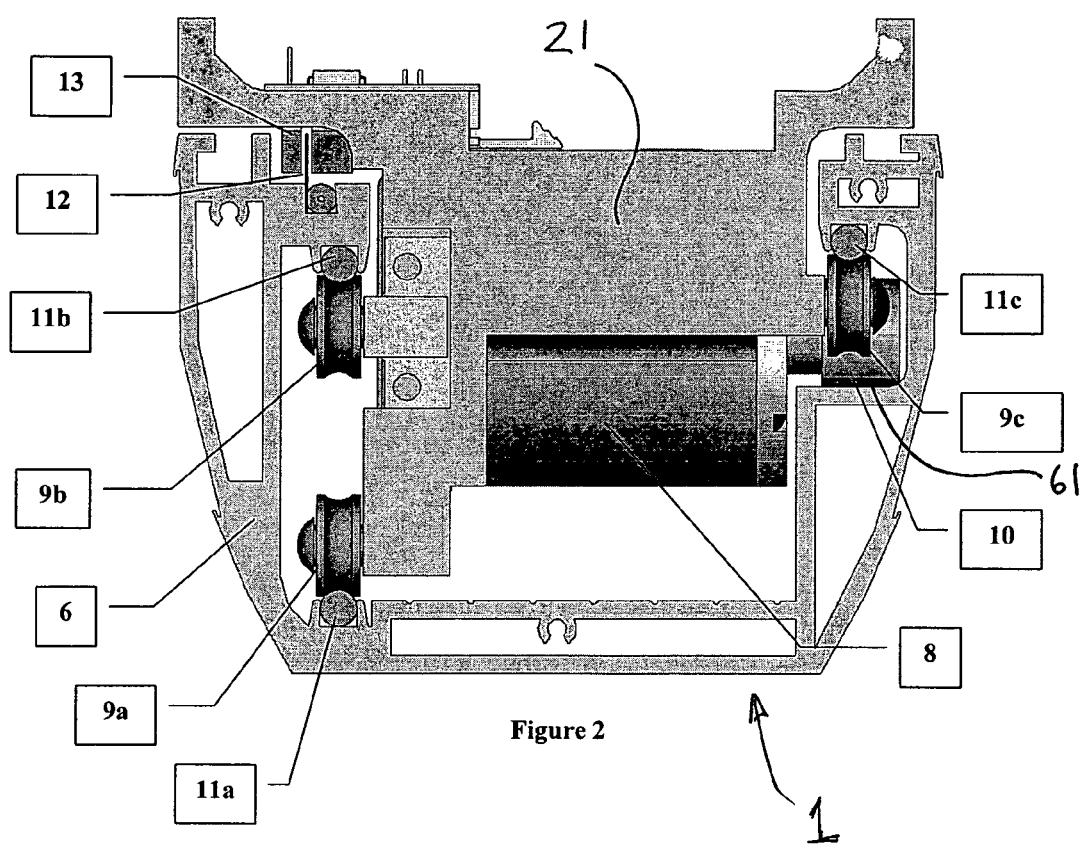
FIG. 2 shows a cross section of a Y-axis linear support and associated Y carriage.

In accordance with one aspect of the invention, the X- and Y-axis linear supports 1 and 2 include portions of extruded material (in this case called an extrusion) 6, such as aluminum, carbon fiber or other composite, plastic, or other material, that are used to provide physical support for the Y and Z carriages 21 and 31. FIG. 2 shows a cross sectional view of the X-axis linear support 1 and the Y carriage 21 across the X-axis. The X-axis linear support 1 includes an extruded portion 6 that extends substantially the entire length of the X-axis linear support 1. In this embodiment, the extruded portion 6 has linear bearing elements 11, e.g., steel bars, that are attached to, extruded with or otherwise associated with the extrusion 6. For example, the linear bearing elements 11 may be steel rods that are snapped into place within channels or other features formed in the extrusion 6. The Y carriage 21, moves along the bearing elements 11 by means of roller bearings 9 having a grooved outer surface that engages a respective bearing element 11. Although not shown in the figures, the Z carriage 31 may have a similar mounting arrangement on the Y-axis linear support 2.

The configuration of the linear bearing elements in the Y-axis linear support 2 constitutes one aspect of the invention. Most machines that use roller bearings with a groove or arch use only two linear bearing elements to support a carriage. In the case of the robotic device shown in FIG. 1, the Y-axis linear support 2 is cantilevered from the X-axis linear support 1. This creates a relatively large overturning moment on the bearing elements 11 in the X-axis linear support 1. If only two bearing elements 11 are used, for example elements 11a and 11b, the moment on the carriage 21 may place large axial forces on the roller bearings 9a and 9b, which generally can withstand much higher radial forces than axial forces. Adding the third bearing element 11c provides a bearing surface that resists the overturning moment with a radial load on the bearing 9c. As a result, the bearings 9a, 9b and 9c support the Y carriage 21 with largely radial loads being exerted on the bearings 9. This allows a cantilevered support to be constructed with low cost bearings, which can withstand much higher cantilevered loads than a design with only two linear bearing elements.

One aspect of the invention involves the use of a "net shape" drive surface on a support that is contacted by a traction wheel of a traction drive system associated with a carriage or other member that is movable relative to the support. As used herein, a "net shape" surface is one that is created during initial formation of the portion that carries the surface. For example, a "net shape" surface on a part is a surface that is created during extrusion, pultrusion, casting, molding or other initial formation of the part. A "net shape" surface does not include surfaces that are formed by machining, e.g., including grinding, polishing, filing, milling, turning or other similar operations generally intended to flatten, smooth or otherwise refine an existing surface on a part. This is not to say, however, that a part that includes a "net shape" drive surface may not have other machined surfaces, e.g., surfaces used for assembling the part to other components. To the contrary, a part may have such machined surfaces, yet have a "net shape" drive surface that is not created by a machining operation. This aspect of the invention may provide for a lower cost robotic device, since typically expensive machining operations are not required to create the drive surface engaged to move a carriage or other member.

In this illustrative embodiment, the Y carriage 21 is moved along the extrusion 6 by a motor 8 which has a traction roller or wheel 10 mounted on the motor shaft that engages with a drive surface 61 on the extrusion 6. In accordance with one aspect of the invention, the drive surface 61 is a "net shape" surface, i.e., the surface was formed when the extrusion 6 was extruded. No other treatment of the drive surface 61 need be provided, such as machining to smooth or shape the drive surface 61. Instead, the drive surface 61 may be used by the traction wheel 10 in a form unchanged from that after extrusion. As discussed above, the extrusion 6 may be formed by other techniques, such as casting, molding or other (in which case the part may be called a "casting", "molded part", etc.). In any case, however, the drive surface 61 may be a "net shape" element that is unchanged from the form the surface had after casting, molding, etc. In addition, although in this illustrative embodiment the extrusion 6 is formed as a single extruded piece, the extrusion 6 may include two or more assembled parts, which may be formed by any suitable technique or techniques, including machining, molding, extrusion, casting, etc. For example, a majority of the extrusion 6 may be formed by a machining operation, and a portion that provides the traction wheel drive surface 61 may be formed as a separate part and attached (e.g., by welding, bolts, or other fastening arrangement) to the machined portion of the extrusion 6. Rather than being machined, the portion that provides the drive surface 61 may include an extruded or cast bar or other form, for example.

The traction wheel 10 may be made of, or include, an elastic material, such as urethane, that contacts the drive surface 61 on the extrusion 6. The urethane or other suitable material is preferably elastic enough to allow the wheel 10 to roll on the drive surface 61 without damaging the surface. Unlike ball screws, rack and pinion, or belt drives, this traction drive system may have no backlash, no cogging, and require no periodic lubrication, but may allow for slip between the traction wheel 10 and the drive surface 61 of the extrusion 6. Additional traction wheels (and/or drive motors) may optionally be added to increase traction force. In addition, the traction wheel 10 may be resiliently biased into contact with the drive surface 61 on the extrusion, e.g., by a mounting arrangement on the Y carriage 21 for the motor 8 that allows for movement of the motor 8 and wheel 10 toward and away from the drive surface 61 and uses a spring or other resilient element to press the wheel 10 into contact with the drive surface 61.

Figure 3:
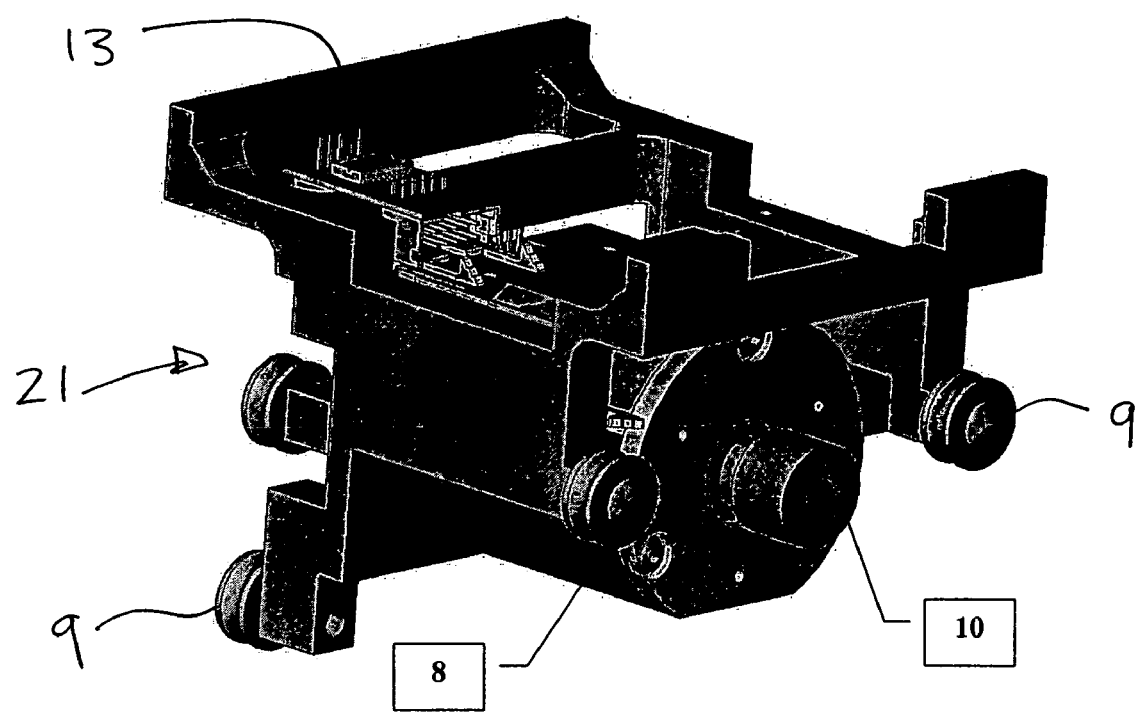
FIG. 3 shows the Y carriage and a traction drive system used for movement of the carriages along the X axis.

FIG. 3 shows a perspective view of the Y carriage 21 separated from the X-axis linear support 1. The motor 8 may have a rotary position sensing device (not shown, and may be internal to the motor 8) on the motor shaft, such as an encoder, for the purpose of controlling motor commutation and/or motor position. Position of the Y carriage 21 along the extrusion 6 may be measured by a linear position sensor 13, which interacts with a linear scale 12 that is fixed to the extrusion 6 (see FIG. 2). Position of the Y carriage 21 relative to the extrusion 6 may be determined in other ways, such as by using the rotary position sensor on the motor 8, laser interferometry, a rotary sensor mounted on the carriage 21 that engages with a rack or other surface of the extrusion 6, etc. The linear position sensor 13 may normally have a high resolution (i.e. relative accuracy), but need not necessarily have high absolute accuracy. The sensor 13 may be used for position feedback information and for correction of creep or slippage of the traction drive. In this embodiment, the combination of the relatively low-cost traction drive and the linear position sensor 13 allows the robotic device to move the Y carriage 21 with an accuracy equal to the resolution of the linear position sensor 13. Thus, the position resolution of the robot may be determined by the resolution of the linear position sensor 13 and can be very fine, for example as fine as 0.1 microns, which previously could be achieved only with relatively more expensive linear motors. However, to reduce cost and complexity in some embodiments, the linear position sensor 13 may be eliminated, and only the rotary position sensor on the motor 8 used for position information. In this case any traction drive creep or slippage may be compensated by using the machine vision system 5 to measure a position error for acquiring or placing a workpiece, and/or to make error measurement using fiducials at known locations in the workspace. As a different option, the rotary sensor may be eliminated and only the linear position sensor 13 used. In this case a motor commutation algorithm may continuously monitor motor performance and adjust the motor commutation counter to compensate for traction drive slippage.

Figure 4:
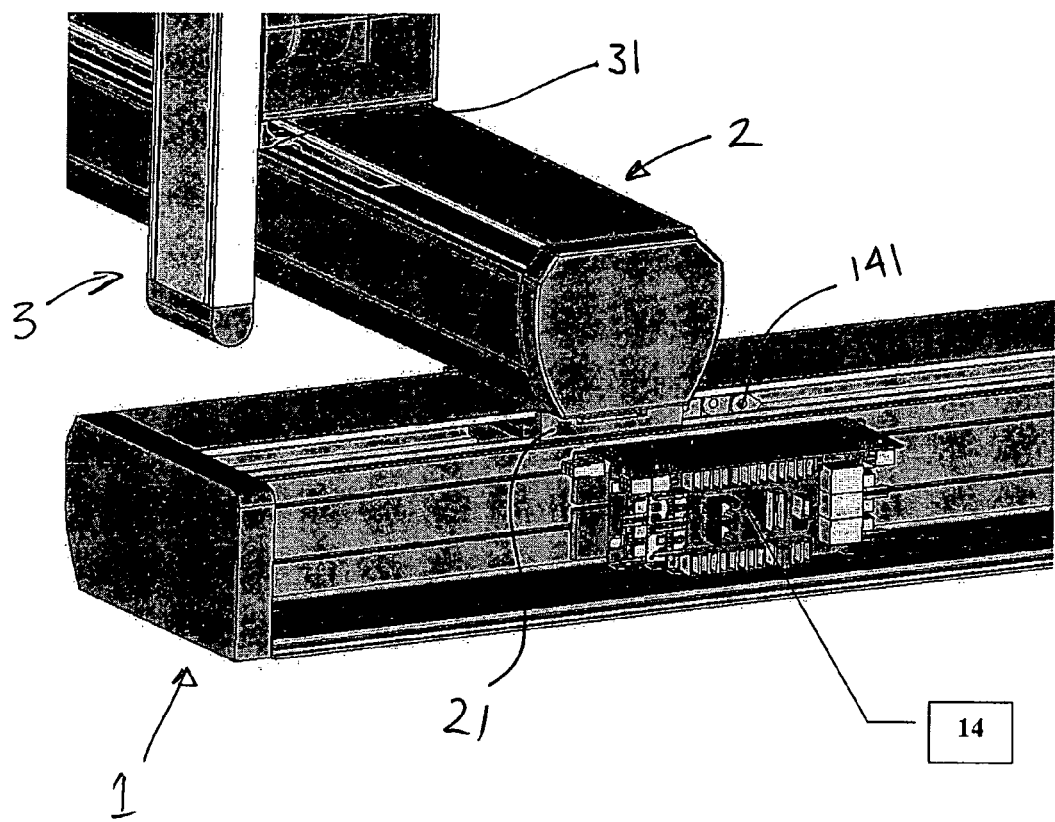
FIG. 4 shows a controller embedded in one of the linear supports.

In accordance with another aspect of the invention, a controller 14 may be mounted inside the X-axis linear support 1 and/or another support in the robotic device, as shown in FIG. 4. Wires, pneumatic hoses and/or other lines from the controller 14 to the motors/encoders/etc. of the robotic device, may be contained inside the support 1. A harness 141 for the wires and other lines may roll in a service loop that may also fit inside the support 1. This is in contrast to existing Cartesian and other robots which have a controller, wire harness and pneumatic hoses outside the mechanism, contained by cable carriers or "fly-over" hoses. In accordance with this aspect of the invention, some of the following advantages may be realized: there are no external cable carriers or hoses that can become entangled with other equipment in the workspace; any particles or contamination generated by the flexing or rubbing of wires and hoses is contained within the robot structure; and the cabling system exerts controlled and highly repeatable forces on the mechanism, unlike external cables that can flail around and create unpredictable forces, which have a negative effect on robot motion settling time. Further, placing the controller 14 and cabling inside the robot eliminates the cost of an external controller cabinet and the cost of additional cables to plug the robot into the cabinet. Placing the controller 14 and cabling inside the robot provides electrical shielding for the cables and controller, and may reduce emitted electromagnetic noise and interference.

Figure 5:
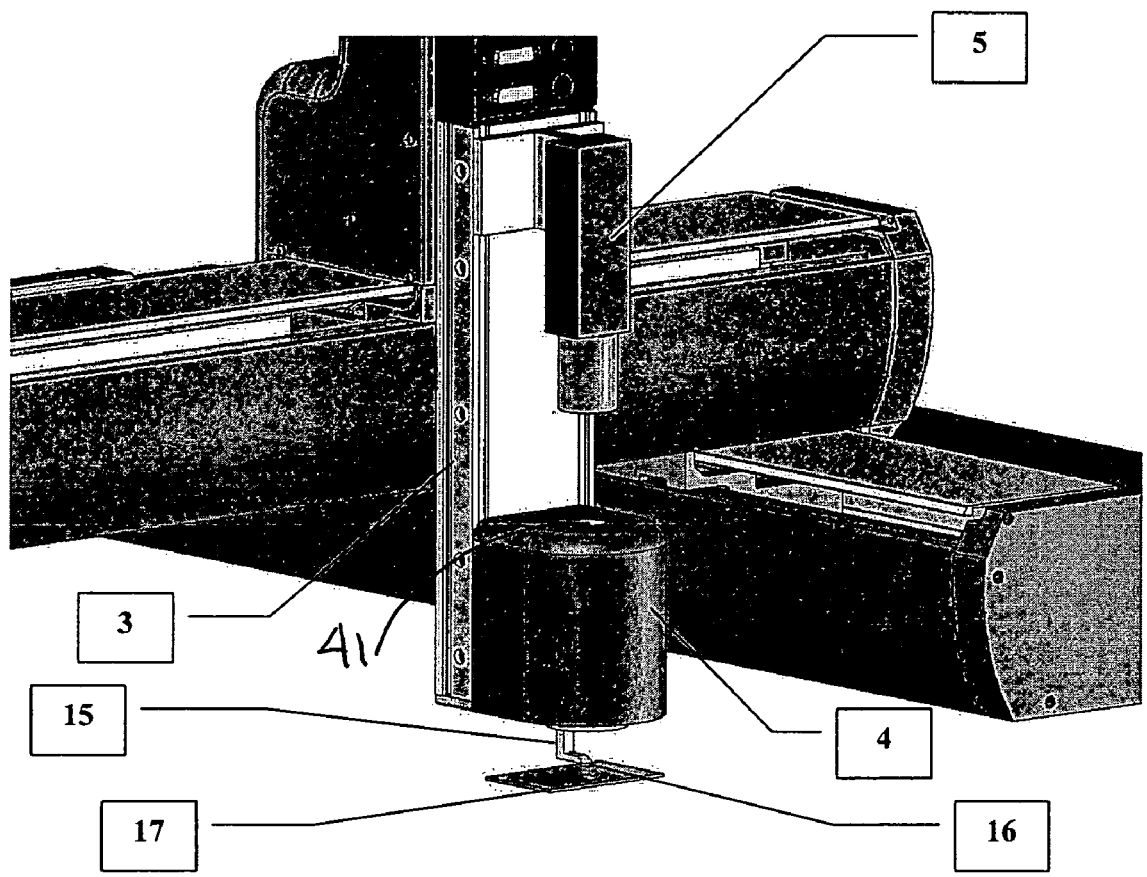
FIG. 5 shows a perspective close-up view of the Z and Theta axes with a machine vision camera.
Figure 6:
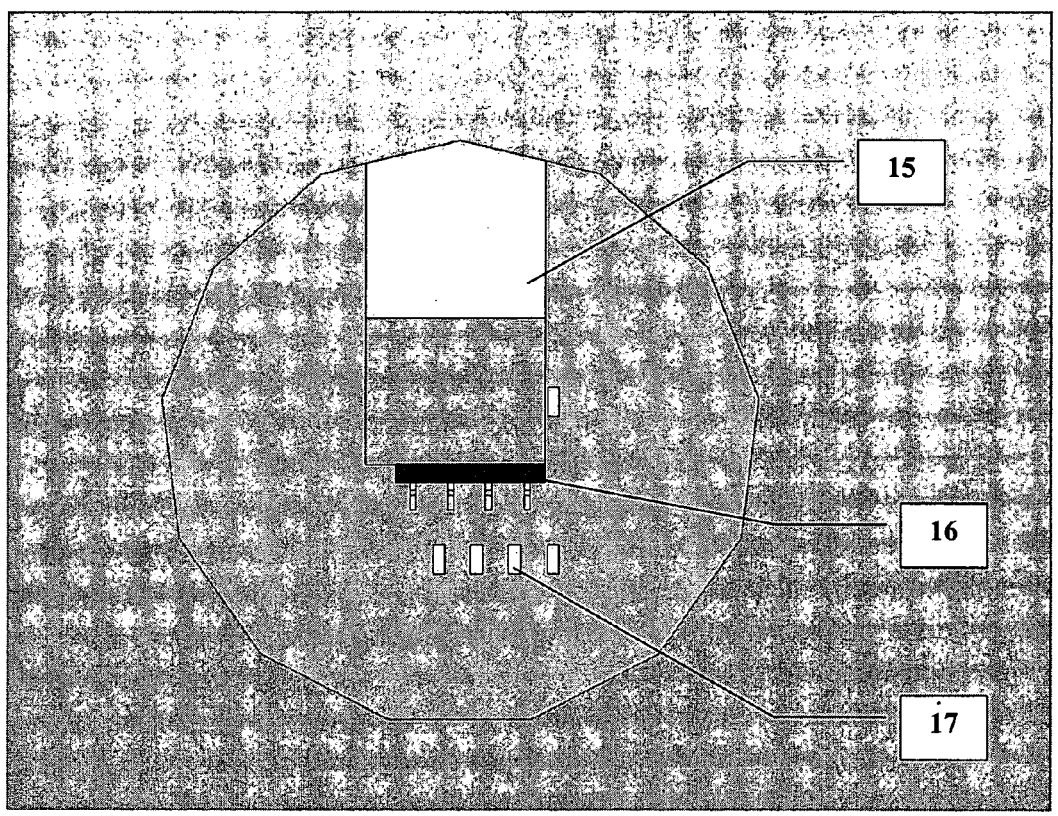
FIG. 6 shows a field of view for the machine vision camera.

In accordance with another aspect of the invention, achieving high-precision part acquisition and placement with a low-cost robotic device is enhanced by the use of machine vision in combination with a design that allows the machine vision camera to view both the part and its destination at the same time in the same field of view. FIG. 5 shows the machine vision camera 5 mounted above theta axis support 4, which includes a hole 41 or other feature such that the camera 5 can simultaneously view a gripper 15 (or other tool), a workpiece 16, and placement location 17. FIG. 6 shows the camera's view in one illustrative condition. The vision system software, which may execute locally as one or more software modules in the robot controller 14, or remotely over a network or other suitable system, may process one or more images captured by the camera 5 and measure a position error between the workpiece 16 and the placement location 17. This measurement can be made iteratively as the robot moves the workpiece 16 into position, with each successive measurement used to further refine the position of the robot, until such time as any position error is undetectable by the vision system. This technique is referred to as "Vision Servoing". Current practice is to use cameras mounted above the robot or on the side of the robot such that after a picture is taken, the robot must move accurately along multiple axes to place a component, and once the robot moves over the placement location, the camera can no longer view the placement location and the placement must be done using only the inherent accuracy of the machine. This requires a more accurate, and therefore, more expensive, mechanical design than does this aspect of the invention. Further, the robot in this illustrative embodiment may compensate for position disturbances to the workpiece 16 during placement, such as a disturbance created by placing the workpiece 16 into solder paste, which causes the workpiece 16 to move slightly.

A further aspect of the invention is a software algorithm for controlling the force applied by the robot during various operations. This algorithm computes a motor torque to compensate for gravity on the Z axis, and then allows the user to specify maximum forces and torques that can be applied by the robot during slow or other motion. The algorithm uses motor currents to approximate forces and torques at slow speeds. This is possible due to the very low friction in the drive trains of the robot design, and the fact that at low speeds inertial forces are small. Thus, once gravity forces are compensated, motor current may provide a reasonable approximation of force or torque. This algorithm is very useful for detecting jamming or crashes during the assembly of components without the need for expensive external force sensors, which are required by existing machines with high-friction and/or non-slip drives.

The Vision Servoing and Force Control algorithms, combined with the mechanical design of the invention, allow a low cost mechanism to achieve performance levels of precision and reliability that previously required machines many times more complex and expensive.

Figure 7:
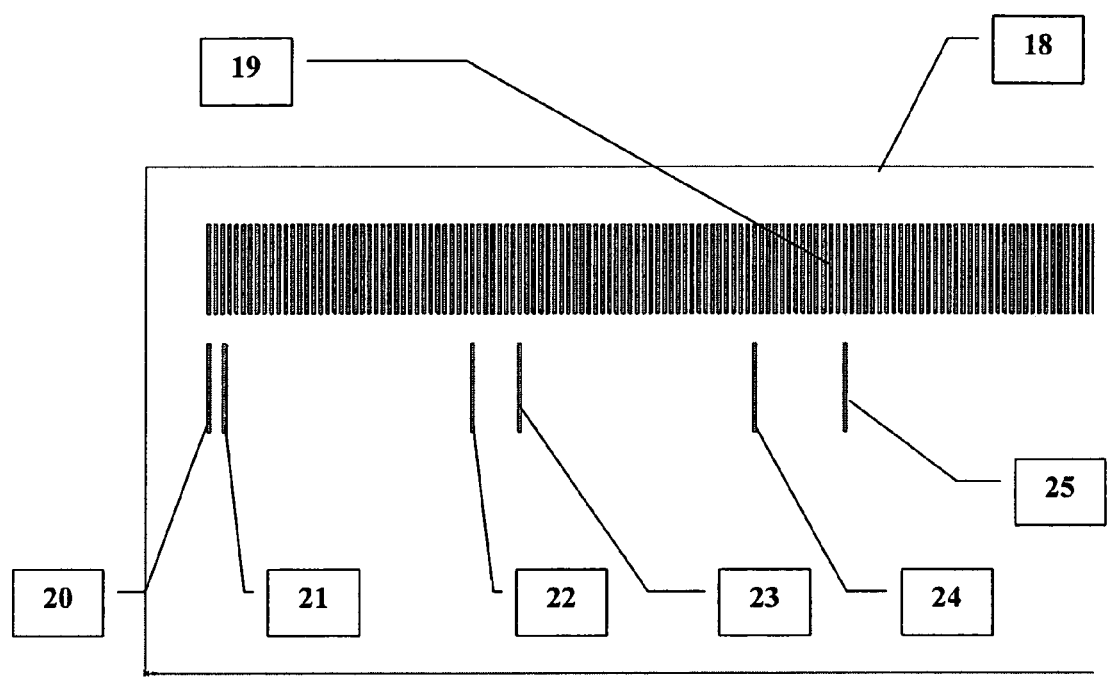
FIG. 7 shows a zero-index track for a linear encoder used to determine a location of a carriage along a linear support.

Another aspect of the invention is a method for determining the position of the carriages and associated supports when the machine is turned on, by moving the carriages a small distance, rather than moving them large distances and/or to one or more ends of travel. This part of the invention employs an incremental position encoder with a coded zero index track with periodic zero indices. FIG. 7 shows an illustrative embodiment of a linear or rotary encoder scale 18 that contains two tracks. The count track 19 includes an evenly spaced series of lines or slits, which may be read by an incremental encoder read head 13 (FIG. 2) to produce two square wave signals 90 degrees out of phase. These square wave signals may be interpreted by the controller 14 or other device to determine the direction in which the head is traveling and to increment a position counter up or down. A second track on the encoder scale 18 contains a series of marks which are referred to herein as a "zero index code" 20-25. It is common in the art to have a single zero index mark, which is read by the read head 13 to initialize the position counter. However, reading a single zero index mark requires that the carriage 21 potentially travel the entire length of the scale until this mark is reached, typically at or near the limit of travel at one end of the scale. This is often not desirable, especially when a robot is located in a complex work cell with other equipment, which the robot must avoid.

One approach to avoid this problem is to add multiple tracks to the scale, each successive track with half the number of lines, where each line is twice as wide as the lines on the previous track until a track with only one wide line and one space is achieved. This is called an absolute encoder, as it is possible to determine a unique location when power is turned on to the encoder by reading all the tracks. However this is expensive, bulky, and becomes impractical for high resolution or long encoders as the number of tracks can be 20 or more. Another alternative uses a series of zero index marks on the same track, where each mark is separated by a unique number of lines on the count track 19. This has the advantage of reducing the travel required to at most two successive index marks minus one encoder count, assuming the travel begins just after an index mark, which is the worst case. The disadvantage of this approach is that successive marks must be spaced successively farther apart in order to maintain a unique number of lines between them, and it is desirable to have the required motion be relatively small.

One aspect of the invention addresses these limitations by using codes on the zero index code track 20-25 which each have a fixed number of bits, where the location of each bit in each code corresponds to a line on the incremental count track 19. A portion of each code is repeated periodically along the index track, e.g., repeated every 32 lines on the count track 19, and may be interpreted as a zero index mark by software. Another part of each code's bit pattern is used to assign a unique label to the index code so that the system may determine which code is being read by the reader 13. By scanning a complete code, a unique zero index bit string can be determined. For example, if the count track 19 has 32 lines per millimeter, and the bit pattern for each index code is 32 bits long, a unique index code can be provided for each section of 32 lines of the count track 19. Thus, each millimeter long segment of the count track 19 may be assigned a unique 32 bit index code, and depending on the number of bits used in the fixed zero index code portion, unique codes may be assigned to each millimeter of a track 19. Also, assuming the worst case where the robot starts to move at 1 bit past the end of a particular zero index code, the position of the reader 13 may be determined by moving the robot no more than about 2 mm. As an example, if each set of 32 lines in the count track 19 is to be assigned a unique index code, the index code may include 32 total bits. Seventeen bits may be used as the fixed portion of the index codes to indicate to the system that an index code is being read, e.g., "11111111111111111" may be used as a fixed portion of each index code. Thus, the variable (or unique) portion of each index code may be 15 bits long. If each bit may have one of two values (0 or 1), the 15 bit variable portion of the code may support a scale 12 that is up to about 32 meters long, assuming 32 lines per millimeter on the count track 19.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A robotic system comprising:
a first carriage movable relative to a first axis;
a first drive system associated with the first carriage, the first drive system including a traction wheel;
a first support that supports the first carriage for movement relative to the first axis, the first support having a portion with a drive surface that is contacted by the traction wheel to move the first carriage relative to the first support; and
a position sensor adapted to determine a position of the first carriage relative to the first support;
wherein the traction wheel and drive surface are arranged to allow for slip of the traction wheel relative to the drive surface.

2. The system of claim 1, wherein the drive surface on the first support is a net shape surface requiring no machining for formation.

3. The system of claim 1, wherein the position sensor and first drive system are adapted to repeatedly and accurately position the first carriage relative to the first support at one or more positions.

4. The system of claim 1, wherein the position sensor includes a rotary encoder associated with a rotational axis of the traction wheel.

5. The system of claim 4, wherein the first drive system includes a drive motor having a shaft, and wherein the traction wheel is mounted to the shaft and the rotary encoder detects a rotational position of the shaft.

6. The system of claim 1, wherein the position sensor includes a linear encoder and/or a rotary encoder.

7. The system of claim 6, wherein the position sensor includes a linear encoder that detects a linear position of the first carriage relative to the first support.

8. The system of claim 1, wherein the first support includes a plurality of guide rails that engage with rolling bearing elements on the first carriage.

9. The system of claim 1, further comprising a second support attached to the first carriage, and a second carriage that is supported by the second support and is moveable relative to a second axis that is transverse to the first axis.

10. The system of claim 9, wherein the second carriage is linearly movable along the second axis.

11. The system of claim 10, further comprising a second drive system associated with the second carriage, the second drive system including a traction wheel, and wherein the second support includes a second portion with a drive surface that is contacted by the traction wheel of the second drive system to move the second carriage relative to the second support.

12. The system of claim 10, wherein the second portion including the drive surface is formed by a net shape manufacturing process requiring no machining.

13. The system of claim 9, further comprising a third carriage that is supported by and moveable relative to the second carriage along a third axis.

14. The system of claim 13, wherein the third axis is transverse to the second axis, and wherein the third carriage includes a fourth mechanism that is rotatable about an axis parallel to the third axis relative.

15. The system of claim 13, further comprising a vision system adapted to provide image information used to control movement of the first, second and third carriages and the fourth mechanism.

16. The system of claim 1, wherein a force supplied by the traction wheel to move the first carriage is controlled based on current provided to the first drive system.

17. The system of claim 1, further comprising a controller that communicates with the first drive system and the position encoder via wiring, wherein the first support includes an enclosed space to house at least a portion of the wiring.

18. The system of claim 1, wherein the portion with the drive surface is formed using a linear extrusion or pultrusion process.

19. The system of claim 1, wherein the first support includes an extruded portion that forms the drive surface and includes up to three linear bearing surfaces that engage with and support the first carriage; the system further comprising:
a second support having an extruded portion that forms a second drive surface and up to three linear bearing surfaces, the second support being attached to the first carriage in a cantilevered arrangement;
a second carriage having a second drive system with a traction wheel that engages with the second drive surface to move the second carriage relative to the second support; and
a third support attached to the second carriage.

20. The system of claim 19, wherein the third support supports a third carriage that is movable relative to the third support.

21. A robotic system comprising:
a first carriage movable relative to a first axis;
a first drive system associated with the first carriage, the first drive system including a traction wheel;
a first support that supports the first carriage for movement relative to the first axis, the first support having a portion with a drive surface that is contacted by the traction wheel to move the first carriage relative to the first support;
a position sensor adapted to determine a position of the first carriage relative to the first support; and
a vision system adapted to provide image information used to control movement of the first carriage;
wherein the drive surface on the first support is a net shape surface requiring no machining for formation.

22. A robotic system comprising:
a first carriage movable relative to a first axis;
a first drive system associated with the first carriage, the first drive system including a traction wheel;
a first support that supports the first carriage for movement relative to the first axis, the first support having a portion with a drive surface that is contacted by the traction wheel to move the first carriage relative to the first support;
a position sensor adapted to determine a position of the first carriage relative to the first support; and
wherein the drive surface on the first support is a net shape surface requiring no machining for formation, and wherein the first drive system provides a zero-backlash drive for the first carriage.

23. A robotic system comprising:
a first carriage movable relative to a first axis;
a first drive system associated with the first carriage, the first drive system including a traction wheel;
a first support that supports the first carriage for movement relative to the first axis, the first support having a portion with a drive surface that is contacted by the traction wheel to move the first carriage relative to the first support;
a position sensor adapted to determine a position of the first carriage relative to the first support;
a tool adapted to engage with a workpiece and move the workpiece at a desired location; and
a vision system adapted to simultaneously capture an image of the workpiece and the desired locations,
wherein the drive surface on the first support is a net shape surface requiring no machining for formation.

24. The system of claim 23, wherein the vision system is adapted to capture the image while viewing the desired location through an opening in a portion of the robotic system.

* * * * *